United States Patent
Meyer

(10) Patent No.: US 6,308,453 B1
(45) Date of Patent: Oct. 30, 2001

(54) SAFETY LURE

(75) Inventor: Herman R. Meyer, 1212 Calle de Cobre, Sahuarita, AZ (US) 85629

(73) Assignee: Herman R. Meyer, Sahuarita, AZ (US)

( * ) Notice: Subject to any disclaimer, the term of this patent is extended or adjusted under 35 U.S.C. 154(b) by 0 days.

(21) Appl. No.: 09/377,020

(22) Filed: Aug. 18, 1999

Related U.S. Application Data

(63) Continuation-in-part of application No. 09/063,996, filed on Apr. 12, 1998, now abandoned.

(51) Int. Cl.$^7$ .............................. A01K 85/00; A01K 83/02
(52) U.S. Cl. ........................................................ 43/37; 43/35
(58) Field of Search .................. 43/37, 41, 42.02, 43/42.06, 42.36, 42.41, 35

(56) References Cited

U.S. PATENT DOCUMENTS

| | | | |
|---|---|---|---|
| 635,547 | * | 10/1899 | Howard ................................. 43/37 |
| 1,204,538 | * | 11/1916 | Belding ................................. 43/37 |
| 1,209,237 | * | 12/1916 | Warren ................................. 43/35 |
| 2,136,713 | * | 11/1938 | Schnabel ............................ 43/42.36 |
| 2,147,444 | * | 2/1939 | Kelly ................................. 43/42.36 |
| 2,288,009 | * | 6/1942 | Matasy ................................. 43/37 |
| 2,424,706 | * | 7/1947 | Pelham ................................. 43/35 |
| 2,470,861 | * | 5/1949 | Prentice ................................. 43/35 |
| 2,729,013 | * | 1/1956 | Chandler ................................. 43/35 |
| 3,086,313 | * | 4/1963 | Dinehart ................................. 43/35 |
| 3,631,624 | * | 1/1972 | Edde ................................. 43/35 |
| 3,665,634 | | 5/1972 | Baud . |
| 3,815,274 | | 6/1974 | Schleif . |
| 3,964,202 | | 6/1976 | Ruppa . |
| 4,433,502 | | 2/1984 | Steeve . |
| 4,614,054 | | 9/1986 | Fovenyessy . |
| 4,817,325 | | 4/1989 | Thomas . |
| 5,611,166 | * | 3/1997 | Day ................................. 43/35 |
| 5,628,138 | * | 5/1997 | Murray ................................. 43/35 |
| 5,878,524 | * | 3/1999 | Braden ................................. 43/37 |
| 6,094,853 | * | 8/2000 | Lim ................................. 43/41 |
| 6,105,303 | * | 8/2000 | Hall ................................. 43/42.04 |

* cited by examiner

Primary Examiner—Kurt Rowan
(74) Attorney, Agent, or Firm—LaValle D. Ptak

(57) ABSTRACT

An improved safety fishing lure includes a main body portion which is hollow. The front end of the main body portion is designed to be attached to a fishing line. The main body portion also has a groove in it for protecting the point of a hook. A hook is movably mounted in the main body portion for movement from a storage position, with the point in the groove, to an active fish catching mode with the point extended out of the groove beyond the main body portion. A holding mechanism including a spring is used to hold the hook in its storage position. A release mechanism is coupled with the holding mechanism for disengaging the holding mechanism in response to movement of the main body portion through the water to cause the hook to move to its active fish catching position.

6 Claims, 2 Drawing Sheets

SAFETY LURE

RELATED APPLICATION

This application is a Continuation-in-Part of my application Ser. No. 09/063,996, filed Apr. 21, 1998 now abandoned.

BACKGROUND

This invention relates to a fishing lure with a rigid body, a hook protective groove, and a controlled moving hook with the purpose of making fishing safer, especially for children while they are casting with my lure.

Prior art lures, which claim protection for hooks, use flexible enclosures. They rely on the force of the fish bite to push the protective cover aside, exposing the hook. Their main purpose is for preventing hooks from catching on weeds, rocks, roots, and other debris. In example, U.S. Pat. No. 3,964,202 by Aaro Arvo Ruppa, 4,614,054 by Otto K. Fovenyessy, 3,815,274 by George H. Schleif, 4,433,502 by Edward J. Steeve, and 4,817,325 by John Thomas. There are other patents of this general type, but these are representative.

A patent of particular interest in this group of patents which rely on the force of a fish bite to expose the hook, is the U.S. Pat. No. 3,665,634 to Baud. The Baud patent has the hook fully enclosed in the lure body; and an opening in the body is provided for receiving a permanently attached leader. This leader extends into the body interior to engage a lever which is offset from a pivot on which the hook is mounted. Another trigger device, designed to resemble the fin of a fish, extends upwardly out of the body and holds the opposite side of the lever arm to which the leader is attached, in a cocked or retracted position inside the body. A substantial amount of force may be extended by the leader onto the lever arm without pivoting the hook outside the body, because it is secured by means of the trigger fin. The intent of this lure is to cause the hook to be released by a fish depressing the trigger fin. This moves the fin lever out of engagement with the holding latch on the hook lever arm; so that the force on the leader then rapidly pivots the hook out of the body of the lure, permitting it to engage the mouth of the fish. The device shown in this patent is more complex than some of the other devices discussed above and found in the prior art; but generally, all of them require some force exerted by the fish on the lure body to extend the hook into a position where it may be used to catch the fish. It also should be noted that once the hook has been extended in the lure of Baud, it is necessary to push on the barbed end of the hook to force it back into the body, to reset the device for a subsequent use.

These and other lures still have the capacity to jab, stab or "hook" someone while handling during normal fishing duties, also in their storage. If the hook sticks far enough to bury the barb, it is very difficult and painful to remove the hook, sometimes requiring expensive hospital care.

It is desirable to provide a safety lure which overcomes the disadvantages of the prior art.

SUMMARY OF THE INVENTION

For the record, objectives and advantages of my safety lure that improves on the prior art are to:

(a) provide a safer lure for children while they are casting;
(b) provide a safer lure for the general fishing public while they are casting;
(c) provide a safer lure for innocent bystanders. in the area of casting being performed;
(d) provide a safer lure while fishing line is being attached;
(e) provide a safer lure for normal handling while fishing;
(f) provide a safer lure while in storage.

A further objective is to reduce the number of trips people have to take to the hospital. Having a fish hook surgically removed is painful and expensive.

Flying fishing lures, when being cast, are dangerous, even prior art protective hook lures. They claim to slide by weeds and other debris, but are still dangerous when being cast, because of the flexible coverings they use. My rigid body lure with a hook protective groove will help reduce the danger.

In accordance with a preferred embodiment of the invention, a fishing lure consists of a main body portion. The main body portion has a front end and a rear end, and has a groove in it for protecting the point of a hook. A hook is movably mounted in the main body portion for movement from a storage position, with the point thereof in the groove, to an active position with the point thereof extended beyond the main body portion, out of the groove. A holding mechanism for holding the hook in the storage position is located in the main body portion; and this holding mechanism is coupled with a release mechanism. The release mechanism disengages the holding mechanism in response to movement of the main body portion through water to thereby release the hook to its active position.

Other objectives and advantages will be evident from a consideration of the following description and drawings.

DETAILED DESCRIPTION

Figure 1:
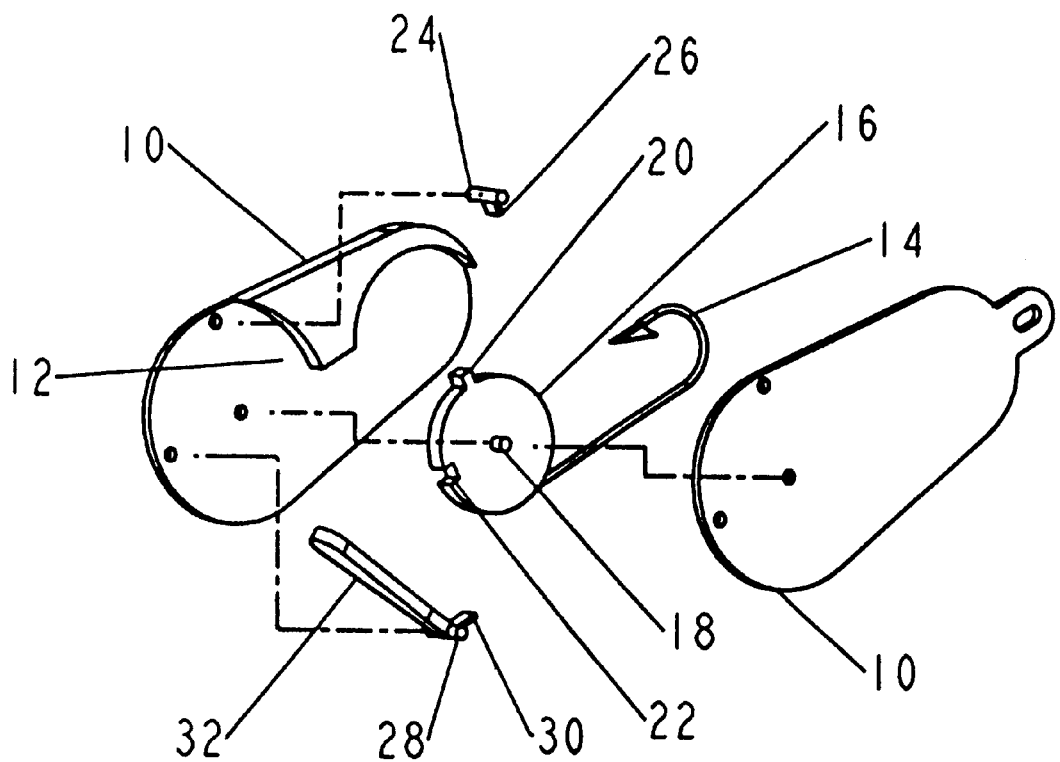
FIG. 1 shows a perspective view of an exploded expression of a preferred embodiment of my safety lure while in the cocked position.
Figure 2:
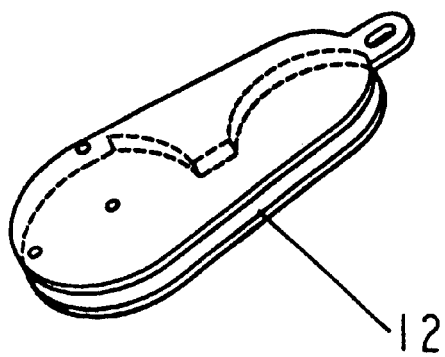
FIG. 2 shows a perspective view of the split body of the lure, as in FIG. 1, joined together to form the groove, with the informational transfer system, cocking-releasing system, and hook not shown.

FIG. 1 shows a perspective view of one embodiment of my safety lure. A typical embodiment is a lure 10 with a rigid body having a groove 12, as in FIG. 2, of sufficient depth and width as to protect a hook 14 and house the informational transfer system.

The hook 14 is cast as part of or welded to wheel 16. Attachment point is in the neighborhood of 100 degrees to 170 degrees when wheel 16 is in the cocked position, as shown in FIG. 1.

The thickness and diameter of the wheel 16 is to fit inside groove 12. It is cast as a part of or welded to a wheel axle 18, which is rod-like in shape. The diameter of the axle 18 is slightly smaller than the width of the accepting recesses bore into the walls, at right angles, of groove 12. Its length is shorter than the width of groove 12 and shorter than the width of lure 10. Also case as a part of or welded to the wheel 16 is a tooth 20. The tooth 20 is an upward portion of the perimeter edge of the wheel 16. Attachment point is a 0 degree when wheel 16 is in the cocked position. Its length is about 1 degree to 2 degrees long The width is the same as the width of wheel 16. The height is tall enough to abut a regulator 26, yet short enough to slide, with desired force, by the flexible regulator 26. When wheel 16 is in the cocked position a notch 22 is positioned in the 340 degrees to 370 degrees range in the perimeter of the wheel 16. Notch 22 is a void in the mass of the perimeter. Its length is about 1 degree to degrees long. Its width is the same as wheel 16. Its depth is that which permits a push flap 30 to fit inside the void of notch 22 and turn wheel 16 far enough to slide tooth 20 past the regulator 26.

The regulator 26 is a flat piece of flexible material such as metals, plastics or other composites. Various thicknesses can be used. Its width is slightly less than the width of groove 12. Its length is long enough to hold tooth 20 in the 0 degree position, yet short enough to allow wheel 16 to rotate.

The regulator 26 is cast as a part of or welded to a regulator pin 24, which is a rod-like shape. The rod shaped pin 24 extends outwardly from the top portion of the opposing edges of regulator 26. The diameter of pin 24 is slightly larger than the accepting recesses bore, at right angles, into the walls of groove 12. This is a pressed fit to not allow movement of the pin 24. Attachment point of pin 24 is so the regulator 26 is on the same horizontal plane and about 1 degree to the plus side of tooth 20. Position of tooth 20 in relation to regulator 26 is determined by the action of a swivel 28.

Swivel 28 is in the shape of a rod. Its diameter is slightly smaller than the recesses bore, at right angles, into the walls of groove 12. Attachment point is so push flap 30 can work inside of notch 22. Push flap 30 is a flat extension of a central portion of swivel 28. Its width is wider than wheel 16, yet narrower than the width of groove 12. Its thickness is narrower than the length of notch 22. Its length is long enough to be inside notch 22 and capable to rotate wheel 16. The direction of extension from swivel 28 is to the tip of push flap 30 is pointing toward axle 18 with notch 20 in between. The position of push flap 30 is determined by the position of a lever paddle 32.

The lever paddle 32 is an extension of a central portion of swivel 28. It is a broad, flat length of metal, plastic or other composite shaped like a spoon or paddle. The connecting portion of paddle 32 is narrower than the width of groove 12. When hook 14 is in the cocked position paddle 32 should be in a forward leaning position for the best desired interaction with the water. Forward. being towards the line attachment end of the lure.

The above description explains a number of advantages such as, but not limited to, the examples here listed:

(A) children can cast my lure and be free from getting "hooked";

(B) the general fishing public will be safer while casting my lure;

(C) innocent bystanders will be safe from getting "hooked";

(D) tying on fishing line will be safer;

(E) normal routine handling will be safer;

(F) safer storage.

Operation

To operate this safety lure one should make sure the paddle 32 is in the forward cocked position while hook 14 is inside groove 12. Attach fishing line to the safety lure. Cast lure to desired location. During casting, the lure will be going in one direction and then in the opposite direction. The holding capacity of regulator 26 will hold tooth 20 in place during this changing of direction. After the lure is in the water, a sharp pull on the line will initiate the process to release hook 14 from groove 12.

The resistance of the water will force paddle 32 to move to the rear of the lure 10. Movement of the paddle 32 rotates swivel 28. This causes the affixed push flap 30 to move forward. The forward movement of push flap 30 inside notch 22 forces tooth 20 past the flexible regulator 26. With tooth 20 affixed to wheel 16 at a fixed point and hook 14 affixed to wheel 16 at a fixed point they will move in unison. Wheel 16 acts as part of the informational transfer system. Wheel 16 is firmly connected to axle 18 which has free movement inside groove 12. Therefore, wheel 16 is capable of free movement. As tooth 20 moves past the flexible regulator 26, held firmly in position by regulator pin 24, the combination of tooth 20, wheel 16, and hook 14 becomes free to the force of gravity. This pulls hook 14 from groove 12, making hook 14 accessible to fish.

After the fish is "hooked", landed, and hook 14 is removed, simply move paddle 32 forward and swing hook 14 up inside groove 12. When tooth 20 slides to the rear of regulator 26, the lure will be in cocked position, as shown in FIG. 1.

Figure 3:
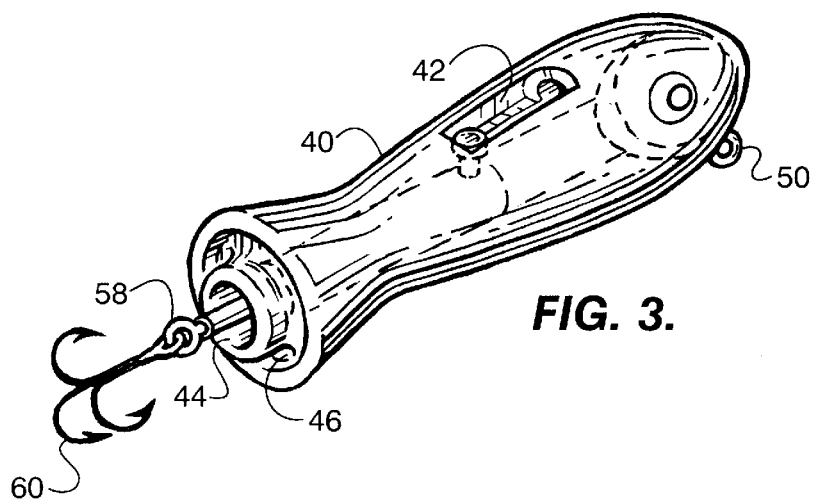
FIG. 3 is a perspective view of another embodiment of my safety lure.
Figure 4:
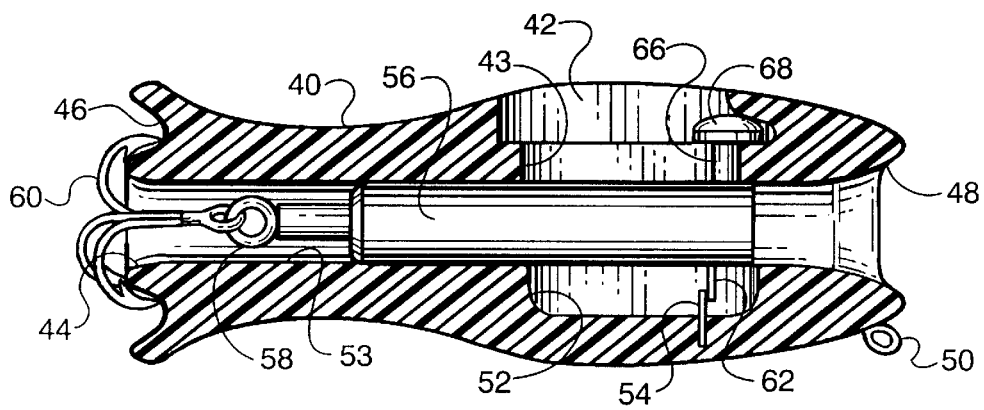
FIG. 4 is a cross-sectional view of the lure of FIG. 3 showing the lure in a first state of operation.
Figure 5:
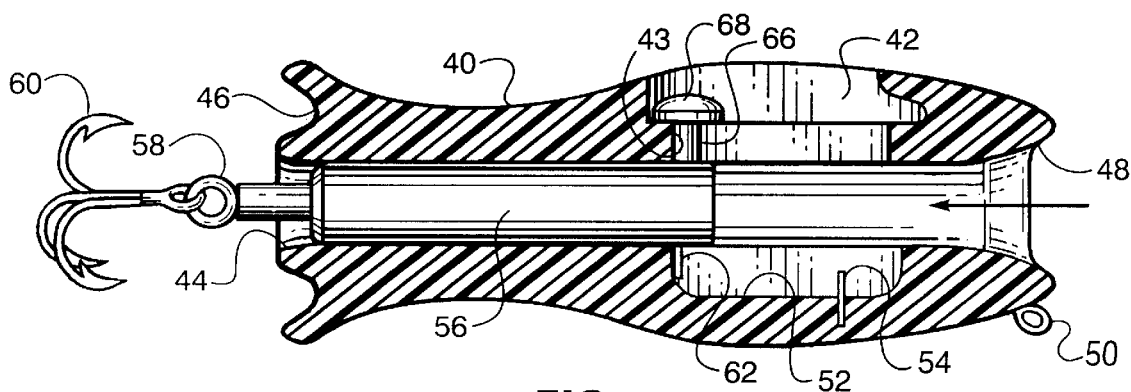
FIG. 5 is a cross-sectional view of the embodiment of FIG. 3 showing the lure in a second state of operation.

Reference now should be made to FIGS. 3, 4 and 5 which are perspective views of another embodiment of the invention. The embodiment in FIG. 3 includes a lure with a rigid main body portion 40, which is illustrated as having the general outside shape of a minnow. The particular shape of the lure and the representation which it has, however, may be of any suitable shape and color designed to attract and catch fish.

The lure shown in FIG. 3 is in its fish-catching or active position of operation. It includes an eyelet 50 on the front for attachment to a leader or fishing line. As illustrated in the cross-sectional views of FIGS. 4 and 5, the lure has a front with a water inlet opening 48 in it. A portion of the interior of the lure is hollow, including an elongated cylindrical bore 53 extending from the front of the lure at the opening 48 and exiting at the rear of the lure at an opening 44. In addition, a slot 52 is formed in an intermediate portion of the lure and extends a portion of the distance between the front and the rear. This slot is shown most clearly in FIGS. 4 and 5.

Around the rear or tail end of the lure is a groove 46, which is shown clearly in FIGS. 3, 4 and 5. When the lure is in its standby or storage position, the various parts are located as shown in FIG. 4. A hook 60, which is shown in FIGS. 3, 4 and 5 as a ganged three-pointed hook, is attached to swivel 58, which in turn is secured to the closed end of an elongated hollow cylinder 56. The right-hand end of the cylinder 56, as shown in FIGS. 3, 4 and 5, is open; and it communicates with the opening 48 in the front-end of the lure 40.

In the standby position, the cylinder 56 is moved toward the right, as shown in FIG. 4, so that the points of the hook 60 all are nested in the groove 46. In this position, the points of the hook 60 cannot catch on or engage any objects; and they are safely out of the way of users of the lure. Since the points of the hook 60 are located in the groove 46, the lure 40 readily may be stored with other lures in a tackle box; and entanglement of the lure with other lures through its hook 60 is prevented. The lure in its standby position, as shown in FIG. 4, also may be cast without concern of the hook points 60 accidentally becoming entangled in a tree or brush, or hooking a nearby bystander.

To hold the hook 60 in the position shown in the standby position of FIG. 4, a short spring 54 in the form of a rectangular piece of spring metal extends from the body 40 into the slot or space 52, near the front of the lure, adjacent the opening 48. This is shown clearly in both FIGS. 4 and 5. This spring 54 constitutes a holding mechanism for holding the lure in its standby position; and it is comparable to the regulator 26 described above in conjunction with the embodiment shown in FIGS. 1 and 2. A projection 62, which may be either a short rectangular rigid member or a circular collar fully or partially encircling the exterior of the cylinder 56, is securely attached to the cylinder 56 by any suitable means. This projection 62 may be formed as an integral part of the cylinder 56, or it may be brazed, welded, or otherwise secured to the cylinder so that it is an integral portion of the cylinder assembly. In the standby storage position shown in FIG. 4, the projection 62 is located on the right-hand side of the holding spring 54. It can be seen that the interaction between the holding spring 54 and the projection 62 causes the points of the hook 60 to be securely located in the groove 46.

When the lure 40 is cast into the water and a sharp tug is made on a line attached to the eyelet 50, water enters the opening 48. The force of this water entering into the cylinder 56 causes the projection 62 to press toward the left, as viewed in FIGS. 4 and 5 to overcome the biasing force of the spring 54, and snap the projection 62 past the spring 54. When this occurs, the projection 62 and a vertical reset pin 66 on the top of the cylinder 56 move with the cylinder 56 toward the left, as shown in FIG. 5, to abut against surfaces 43 and 52, located above and below the cylinder. This holds the cylinder in its rearmost position extending the hook 60 outwardly toward the left, as viewed in FIG. 5. This is the active or fish catching position of the lure. As is readily apparent from an examination of FIGS. 3 and 5, this results in a generally standard configuration of a fishing lure having a ganged set of hooks extending from its rear. In this mode of operation, the lure is actively ready for catching fish. It should be noted that the activation of the lure does not depend upon any action of the fish, but rather on the entry of water under force through the opening 48 to press onto the hollow cylinder 56 and move it toward the rear of the lure, as shown in FIG. 5.

When use of the lure is no longer desired and it is to be placed back in its storage position, the reset rod 56 is moved, by means of the button 68 on its top, through a wider groove 42 from the position shown in FIG. 5 toward the front of the lure, back to the position shown in FIG. 4. This once again stores the points of the hook 60 in the groove 46. The lure then is ready to be cast again, if that is the mode of operation the fisherman is using; or it is ready to be placed in a tackle box for storage until it once again is to be used.

It should be noted that while a manual reset, in the form of the pin 66 and enlarged button 68, is illustrated, other types of reset mechanisms could be used. For example, the pin 66 and possibly even the cylinder 56 may be made of magnetic materials. Then, a magnet placed adjacent the opening 48 of the lure could be used to attract the pin 66 and the cylinder 56 back toward the right to reset the lure in its standby position. If this type of configuration is used, the open slot 42 above the narrower slot 52 no longer would be required; and the opening in the top of the lure body, which is shown most clearly in FIG. 3, no longer would be necessary.

It also is possible to provide a reset mechanism in the form of a battery operated switch and an electrical mechanism for moving the cylinder 56 from the left-most position shown in FIG. 5 back to the reset position shown in FIG. 4. All of this could be incorporated into suitable cavities within the body of the lure 40, particularly for larger sized lures used for catching large fish. It is important to note that whatever is used to reset the lure is not particularly significant. The object here is to have a lure which is activated by pulling it through the water; so that it automatically switches from a standby mode of operation where the points of the hook are protected to an operative mode, where the points of the hook are extended to a position which may be used to catch fish.

CONCLUSIONS, RAMIFICATIONS AND SCOPE

The reader will see that this present invention lure with its rigid body and hook protective groove will greatly reduce the chances of getting "hooked", especially children while they are casting. It is safer for the general fishing public and innocent bystanders during the casting task. While tying fishing line to the safety lure, hands will not come in contact with the sharp point of the hook. This lure can be used as a practice lure with more safety. The number of trips to the hospital to have a hook surgically removed will be reduced. Removing a buried fishing hook is very painful.

The variety of fish and their sizes necessitates various lures. My lure can be varied in size to accommodate any fishing needs. Its body can be made of any number of materials such as metals, plastics, wood, and other composites. Materials can be different colors. Triple and multiple configurations of hook designs can be accommodated by changing the shape of the body and groove. Even two or more paddle and hook combinations can be designed into this lure. Or, one paddle can operate two or more hook setups. Or, multiple paddle systems can operate multiple hook systems.

While the above description contains many specific embodiments, these should not be construed as limitations on the scope of the invention, but rather as an exemplificaton of one preferred embodiment. Other variations are possible.

Thus, the scope of the invention should be determined by the appended claims and their legal equivalents, rather than the examples given.

What is claimed is:

1. A fishing lure including in combination:
    a main body portion having a front end and a rear end, with a groove therein for protecting the point of a hook; the main body portion being at least partially hollow with a water channel extending through it from an opening in the front end to the rear end thereof;
    a hook, having a point, movably mounted in the main body portion for movement from a storage position with the point thereof in the groove to an active position with the point thereof extended beyond the main body portion out of the groove;
    an elongated cylinder movably mounted in the water channel for reciprocating movement therein, wherein the hook is attached to the elongated cylinder at the rear end of the main body portion such that, in the storage position, the hook is pulled into engagement with the groove in the main body portion, and in the active position, the cylinder to which the hook is attached moves toward the rear of the main body portion in response to the force of water acting on the cylinder to extend the hook beyond the rear of the main body portion and out of the groove as the lure moves through water;
    a holding mechanism in the main body portion for releasably holding the hook in the storage position; and
    a release mechanism coupled with the holding mechanism and located for contact with water as the lure is drawn through water for disengaging the holding mechanism in response to the force of water on the release mechanism as the main body portion moves through water.

2. The combination according to claim 1 further including a device for resetting the holding mechanism to the storage position.

3. The combination according to claim 2 wherein the device for resetting the holding mechanism to the storage position comprises a mechanical device.

4. The combination according to claim 3 wherein the holding mechanism comprises a resilient member.

5. The combination according to claim 1 wherein the elongated cylinder is part of the release mechanism an dis movable therein in response to the force of water entering the opening in the front end of the main body portion to move the hook from the storage position to the active position thereof.

6. The combination according to claim 5 wherein the device for resetting the holding mechanism from the active position to the storage position comprises a movable pin attached to the elongated cylinder for sliding the cylinder back toward the front of the main body portion to engage the holding mechanism.

* * * * *